Figure 1:
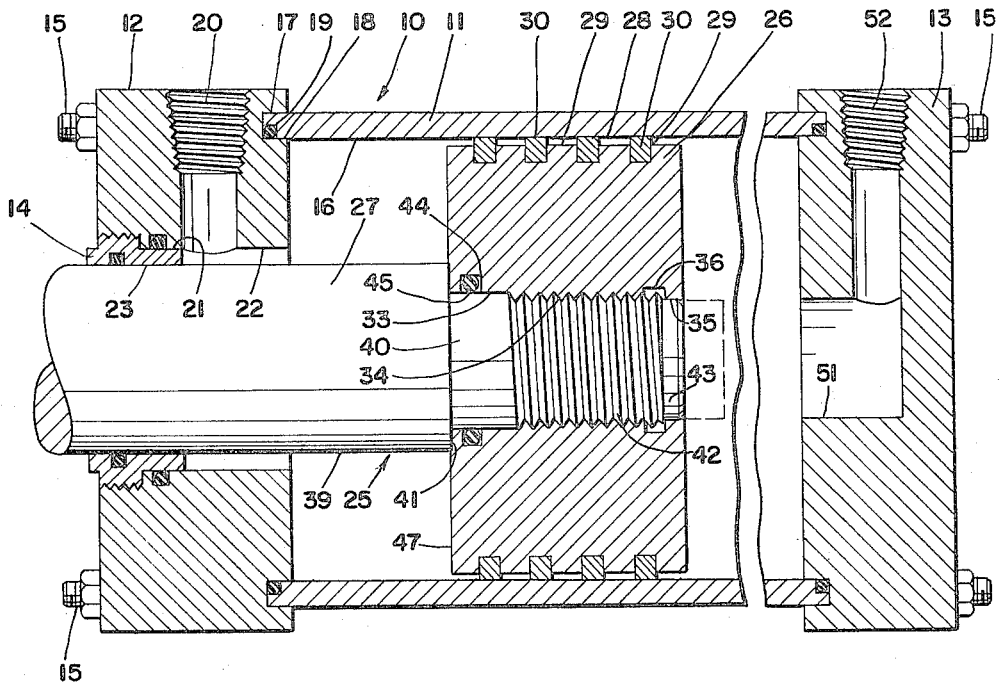

Dec. 27, 1966   R. W. LANMAN   3,293,993
JOINT BETWEEN A PISTON HEAD AND A PISTON ROD OF A FLUID MOTOR
Filed Nov. 5, 1964

INVENTOR.
ROBERT W. LANMAN
BY
John N. Wolfram
ATTORNEY

3,293,993
JOINT BETWEEN A PISTON HEAD AND A PISTON ROD OF A FLUID MOTOR
Robert W. Lanman, Wilmette, Ill., assignor to Parker-Hannifin Corporation, Cleveland, Ohio, a corporation of Ohio
Filed Nov. 5, 1964, Ser. No. 409,167
3 Claims. (Cl. 91—396)

This invention relates to fluid motors and more particularly to the joint between the head and rod of a piston for such motors.

In a well known type of fluid motor there is a cylinder body having a first bore of relatively large diameter in which a piston head has a sliding fit and having a second bore of smaller diameter through an end wall thereof through which a piston rod attached to the piston head extends. The piston rod has a close sliding fit with the smaller bore. The close sliding fits between the head and larger bore and between the rod and smaller bore are not only for the purpose of facilitating sealing therebetween but also to provide bearing support for maintaining the piston in axial alignment with the cylinder body. The latter requires that the bores, head and rod be concentric with each other to a high degree of accuracy.

When the head and rod are made of separate pieces, it is additionally necessary to form the joint between the two in such a manner that the head and rod will not only be concentric but also so that their axes will be coincident, that is, so that the head is not cocked relative to the rod. It is also necessary to provide a means for holding the head and rod together.

The present invention provides such a joint in which the piston head has an opening therethrough for receiving a portion of the piston rod, the opposite ends of the opening providing bearing surfaces in contact with the piston rod and there being a threaded connection intermediate the bearing surfaces for holding the head and rod in assembled relation, with one end face of the head butting against a shoulder on the rod and with a sealing means between the head and rod. This arrangement provides maximum spread of the bearing support of the head upon the rod for holding these parts concentric and in axial alignment and dispenses with a separate nut or other holding means beyond the end of the piston head that would otherwise require additional cylinder length for accommodating the same.

It is thus an object of the invention to provide a joint between a piston head and a piston rod for a cylinder type fluid motor wherein the joint has a maximum bearing length for maintaining the head and rod concentric and in axial alignment and with a means for holding the head and rod together that is located wholly within the head for minimizing the overall length of the cylinder.

It is another object to provide a joint of the type described in which a portion of the rod extends beyond the head and is utilized for cushioning the stopping of the piston.

It is another object of the invention to provide a joint of the type described in which the head and rod are easy to machine and to attach to each other.

Figure 2:
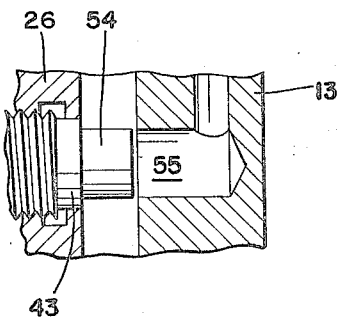

Other objects of the invention will be apparent from the following description and from the drawing in which:

FIGURE 1 is a fragmentary vertical section through a cylinder showing the joint between the piston head and piston rod, and FIGURE 2 is a fragmentary section view showing a modified form.

The invention as illustrated includes a fluid motor or cylinder having a body generally designated 10 which comprises a cylindrical tube 11, a pair of end caps 12, 13 and a bearing bushing 14 threaded into cap 12. The end caps 12, 13 are held onto tube 11 by tie rods 15 or other conventional means, as is well known in the art.

Tube 11 has a cylindrical bore 16 of relatively large diameter, the wall of such bore extending into an annular groove 17 of head 12 and having a close fit with an inner wall 18 of such groove. The cylinder tube 11 is sealed with respect to head 12 by a suitable packing ring 19.

Bearing bushing 14 has an outer cylindrical surface 21 that is a close fit within a cylindrical bore 22 of cap 12, bore 22 being concentric with inner groove wall 18. Bushing 14 also has a bore 23 therethrough which is concentric with outer surface 21 and that is of smaller diameter than bore 16. Cap 12 has a port 20 through which fluid may be introduced to and exhausted from the interior of tube 11 via bore 22. Mounted within the cylinder is a piston generally designated 25 and which includes a head 26 and a rod 27. Head 26 has an outer cylindrical surface 28 that is a close sliding fit within bore 16 and which has a series of grooves 29 therein in which suitable packing rings 30 are mounted for sealing piston head 26 relative to tube 11.

The central portion of piston head 26 has an opening therethrough formed by a first internal cylindrical bearing surface 33, an internally threaded section 34 and a second internal cylindrical bearing surface 35. Between the latter and the internal thread 34 is a thread relief groove 36. Bearing surface 35 is concentric with surface 33 and both are concentric with outer piston head surface 28. Also, the axes of these surfaces are coincident.

Piston rod 27 has a cylindrical outer surface 39 that has a close sliding fit with bore 23 of bushing 14. The rod also has a first cylindrical guide surface 40 that is concentric with outer surface 39, has a close fit with bearing surface 33 and is of smaller diameter than surface 39 so as to form a transverse shoulder 41 therebetween. Adjacent guide surface 40, rod 27 has an externally threaded portion 42 engaged with internal thread 34 and at its inner end rod 27 has a second cylindrical guide surface 43 concentric with surface 40 and a close fit with bearing surface 35. Surface 33 is at least as large in diameter as the major diameter of external thread 42 and surface 43 is no larger in diameter than the root diameter of internal thread 34 whereby the parts may be readily machined and assembled. Surface 33 has a groove 44 therein which contains a packing ring 45 for establishing sealing contact with piston head 26 and surface 40 for preventing leakage of fluid therebetween.

It will be noted that bearing surfaces 33 and 35 are at extreme opposite ends of head 26 so as to have maximum spacing therebetween and therefore provide the longest possible bearing contact with the piston rod at surfaces 40, 43. This provides maximum assurance against cocking or axial misalignment between the head and the rod. Threaded sections 34, 42 for holding the head upon the rod are located between bearing surfaces 33, 35 so that no part of the threaded connection porjects beyond the piston head and therefore the overall length of the cylinder need not provide for such an extending portion and thus may be held to a minimum. Moreover, as more clearly shown in FIG. 2, the outer end of the external thread on rod 27 terminates intermediate the ends of recess 36 so that the forward end of the external thread is out of contact with the transverse end wall of recess 36 that is adjacent bearing surface 35 to thus avoid imposition of sideward thrust between the external thread and the portion of the piston head adjacent bearing surface 35.

It is preferable to place groove 44 in head 26 instead of in rod surface 40 so as to maintain maximum strength in the rod in the vicinity of surface 40 since this section of the rod is put under high tensile stress when the parts are threaded together with end face 47 of the piston head in abutment with shoulder 41 of the rod. However, in an alternate construction, packing ring 45 may be placed in a groove formed in either surface 35 or 43 for sealing the joint between the piston rod and the piston head.

In another form of the invention, the piston rod surface 43 may project beyond piston head 26, as indicated by the dotted line, for entering bore 51 in cap 13 to restrict the flow of fluid from the interior of tube 11 through bore 51 and port 52 and thus provide a fluid cushion for stopping of piston 25 in its movement toward cap 13.

In still another form of the invention as shown in FIGURE 2, the piston has an extension 54 of smaller diameter than guide surface 43 for entering passageway 55 to provide cushion action. In this case passageway 55 is smaller than passageway 51 so as to be a close fit with reduced portion 54.

I claim:

1. A fluid motor comprising a body having a first bore closed at one end by a transverse wall, a second bore through said wall and extending in the same axial direction as the first bore, a piston within said body, the piston having a head with an outer surface having a close fit with said first bore, the piston having a rod extending through the second bore and having an outer surface closely fitting said second bore, said head having axially spaced and aligned first and second generally circular bearing surfaces integral therewith and concentric with said head outer surface and in axial alignment therewith, said piston also having an internal thread integral therewith between said bearing surfaces, said rod having first and second axially aligned guide surfaces integral therewith and concentric with said rod outer surface and in axial alignment therewith and received in said first and second bearing surfaces respectively with a close fit therewith for maintaining said outer surfaces concentric and in axial alignment, said rod having an external thread integral therewith between said guide surfaces, said threads being engaged for holding said head and rod in assembled relation, and a shoulder on said rod engaged by an outer end face of the head for fixing the axial position of the head relative to the rod.

2. The motor of claim 1 in which the forward end of the external thread is axially spaced from said second bearing surface to avoid imposing side thrust to said piston head at said second bearing surface.

3. The motor of claim 1 in which the piston head has an annular recess between the internal thread and the second bearing surface, said recess including an end wall adjacent said second bearing surface, the forward end of the external thread being axially spaced from said end wall to avoid imposing side thrust to said piston head at said end wall.

References Cited by the Examiner

UNITED STATES PATENTS 2,960,068 11/1960 Becker _____ 91—396 X

FOREIGN PATENTS 403,600 11/1909 France.
1,093,047 11/1954 France.

MARTIN P. SCHWADRON, *Primary Examiner.*

EDGAR W. GEOGHEGAN, *Examiner.*

P. T. COBRIN, B. L. ADAMS, *Assistant Examiners.*